Patented Sept. 6, 1932

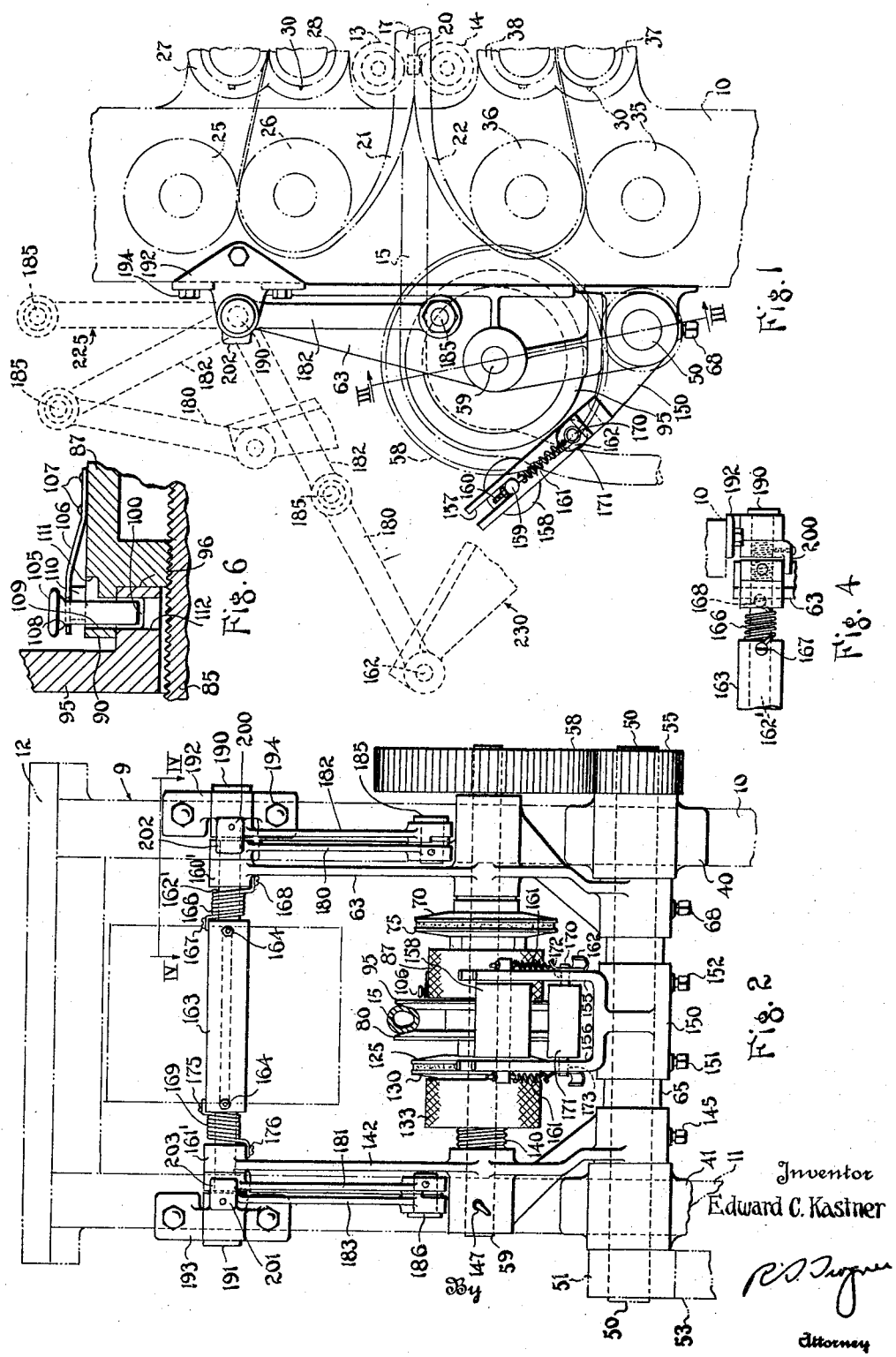
Sept. 6, 1932.  E. C. KASTNER  1,876,241
MANUFACTURE OF RUBBER CONDUITS
Filed July 18, 1929  2 Sheets-Sheet 1
Inventor
Edward C. Kastner
By
Attorney

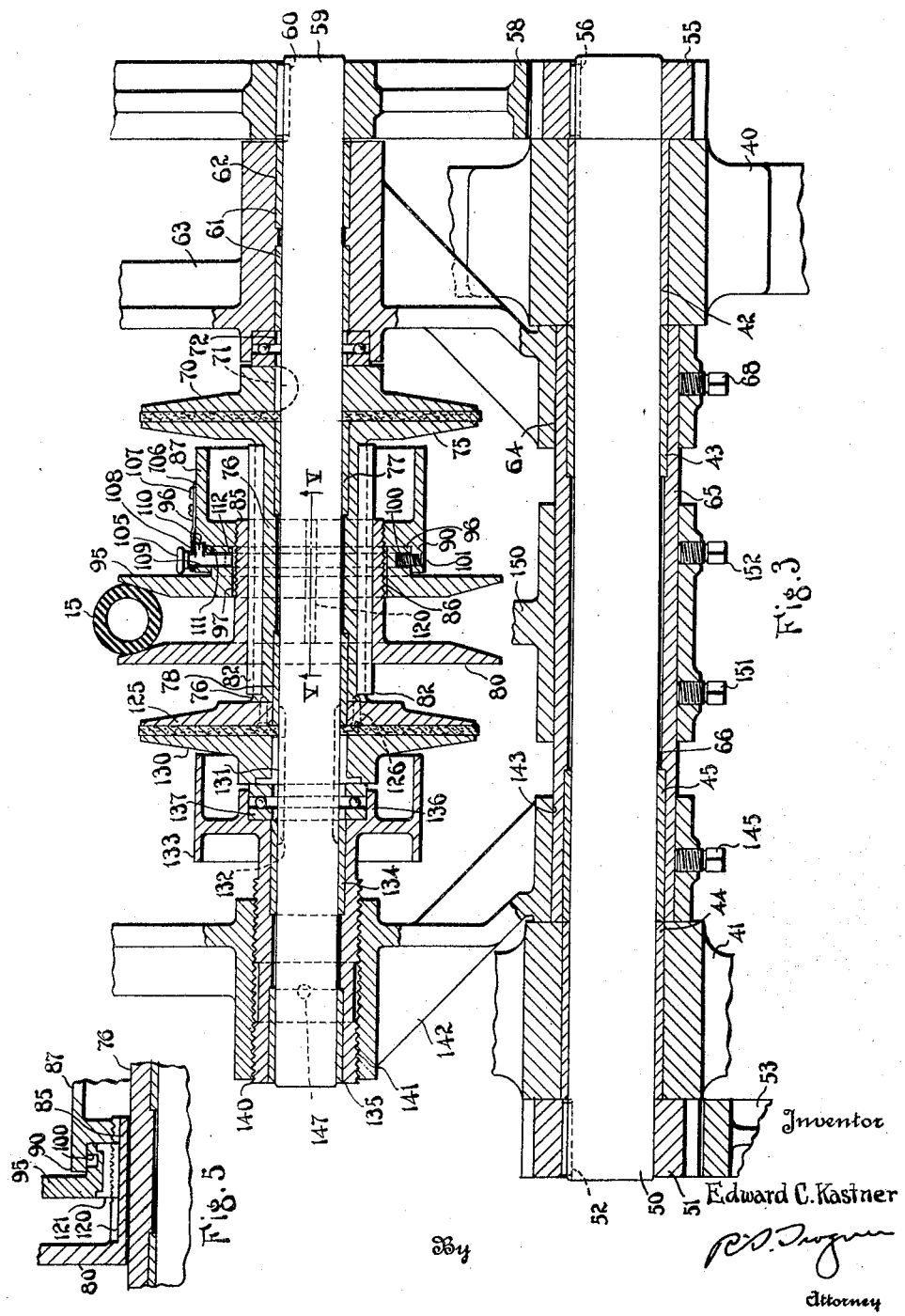

1,876,241

UNITED STATES PATENT OFFICE

EDWARD C. KASTNER, OF AKRON, OHIO, ASSIGNOR TO THE GOODYEAR TIRE & RUBBER COMPANY, OF AKRON, OHIO, A CORPORATION OF OHIO

MANUFACTURE OF RUBBER CONDUITS

Application filed July 18, 1929. Serial No. 379,153.

This invention relates to the manufacture of rubber conduits in which, prior to vulcanization, the conduit is coated with soft metal such as lead, and it has particular relation to a mechanism for facilitating the separation of the lead and conduit subsequent to vulcanization of the latter.

The object of the invention is to provide a mechanism operable in conjunction with a machine for stripping lead from a conduit following vulcanization of the latter, which exerts a constant pull on the conduit thereby preventing the latter from being conducted along with a strip of lead intended to be stripped therefrom, and insuring a continuous uniform movement of the conduit from the stripping machine.

An ordinary process of vulcanizing rubber conduits comprises so coating its outer surface prior to vulcanization with lead that the assembly resembles a cable composed of such metal. During the vulcanization operation, fluid under pressure is admitted into the interior of the conduit, thereby compressing the walls thereof against the inner wall of the lead covering. Following the vulcanizing operation, the lead covering is automatically stripped from the conduit by a machine particularly adapted for that purpose. Essentially, this machine comprises a pair of knives diametrically disposed on opposite sides of the covering, which are adapted to cut through the latter thereby dividing the lead covering into semi-cylindrical forms. Each of these semi-cylindrical forms is drawn from the conduit by a pair of driven rollers between which the form is directed. Thereafter, the lead forms are conducted between cutting rollers and severed into short lengths which are melted and again employed for coating other conduits to be vulcanized. Frequently, during the stripping operation, the conduit adheres to one or the other of the semi-cylindrical forms and is conducted therewith between the pairs of rollers, resulting in a destruction of a considerable length of the conduit. While, ordinarily, an operator has been employed for drawing the conduit from the stripping machine in order to prevent such destruction of the conduit, frequently the adhesion of the conduit to one of the semi-cylindrical lead forms is sufficient to cause movement of the conduit between the rollers before the operator is able to free the conduit therefrom or stop the operation of the stripping machine.

According to this invention, a mechanism is provided for preventing the conduit from being conducted with either of the semi-cylindrical forms of lead thereby preventing any injury of the conduit. This mechanism comprises a pair of conically faced rollers having their conical faces disposed adjacently, which are driven at a slightly greater peripheral speed than the linear speed at which the lead covering is removed from the conduit. These rollers are connected to a driven shaft by means of friction clutch devices in order to permit slipping of the rollers relative to the conduit which is necessary in view of the difference between the peripheral speed of the rollers and the linear speed of the conduit. A second roller, resiliently mounted on a frame which supports the first mentioned rollers, is employed to retain the conduit between the conical faces thereof. The frame is pivotally supported on the frame of the stripping machine in order that it may be moved from its operative position to an inoperative position thereby affording access to the stripping machine for threading the conduit therethrough.

For a better understanding of the invention, reference may now be had to the accompanying drawings, forming a part of the specification, in which:

Fig. 1 is a fragmentary side elevational view illustrating a mechanism constructed according to one form of the invention in conjunction with a machine employed for stripping a lead covering from a rubber conduit following vulcanization of the latter;

Fig. 2 is an elevational view of the mechanism shown by Fig. 1 taken from the left side thereof;

Fig. 3 is a cross-sectional view, on a larger scale, taken substantially along the line III—III of Fig. 1;

Fig. 4 is a fragmentary view of a portion of the mechanism shown by Fig. 2 taken substantially along the line IV—IV thereof;

Fig. 5 is a fragmentary cross-sectional view taken substantially along the line V—V of Fig. 3; and Fig. 6 is a cross-sectional view showing in detail a releasable connecting means, employed in conjunction with certain parts of the machine.

Referring to Figs. 1 and 2, a framework 9 of a machine for stripping a lead covering from a rubber conduit comprises a pair of spaced uprights 10 and 11 interconnected at their upper ends by a horizontal frame member 12. A pair of grooved, vertically spaced rollers 13 and 14 are journaled in the uprights 10 and 11 and driven in opposite directions by any suitable means, not shown. These rollers are adapted to draw a rubber conduit 15, enclosed by a cylindrical lead covering 17, through the stripping machine. Knives 20, disposed on diametrically opposite sides of the covering 17, sever the latter into semi-cylindrical forms 21 and 22 during movement of the conduit 15 and covering 17 between the rollers 13 and 14. The semi-cylindrical form 21 then is conducted between a pair of oppositely rotating rollers 25 and 26 and thereafter between channeled rollers 27 and 28, which are provided with blades indicated at 30 for cutting the lead into short lengths. Similarly, the lead strip 22 is conducted between rollers 35 and 36 and between a pair of rollers 37 and 38 provided with knives 30 for severing it into short lengths.

Referring to Figs. 2 and 3, the uprights 10 and 11 are provided on their front faces respectively with bearing brackets 40 and 41 that have bearing sleeves 42 and 44 respectively disposed therein for rotatably supporting a shaft 50. A gear 51, keyed, as indicated at 52, to the shaft 50, meshes with a second gear 53 which is either driven by a motor (not shown) or by an operative connection with the means for driving the rollers of the stripping machine. Between the bearing brackets 40 and 41, the shaft 50 projects through short sleeves 43 and 45 disposed adjacent the aforesaid brackets, respectively. These sleeves, in turn, are enclosed within a longer sleeve 65 extending between the bearing brackets and which has a central portion 66 of reduced diameter, disposed between the adjacent ends of the sleeves 43 and 45 in abutting relation thereto. By reason of this construction, the longer sleeve 65 is supported on the shorter sleeves 43 and 45, which in turn are supported on the shaft 50.

A gear 55, keyed, as indicated at 56, to the opposite end of the shaft 50, meshes with a gear 58 that likewise has a key connection 60 to a shaft 59. Bearing sleeves 61, rotatably supporting an end portion of the shaft 59, are disposed in an aperture 62 of an arm 63, the lower end of which is provided with an opening 64 through which the shaft 50 and sleeve 65 extend. A set screw 68 adjustably secures the sleeve 65 within the opening 64. Adjacent the arm 63 and on the side thereof opposite the gear 58, the shaft 59 is provided with a disc clutch member 70 which is secured to the shaft by means of a key 71. A thrust bearing 72 is disposed between the clutch member 70 and the arm 63, in order freely to permit rotation of the former with respect to the latter. The clutch member 70 frictionally engages a complementary clutch member 75 which is integral with a sleeve 76 rotatably mounted on bearing bushings 77 and 78 surrounding the shaft 59.

The sleeve 76 supports a cone pulley 80 which is splined to the sleeve by means of keys 82, thereby permitting movement of the pulley longitudinally of the sleeve. At one side, the pulley member 80 is provided with an integral cylindrical boss 85 threaded, as indicated at 86, to receive a knurled cylindrical member 87 threaded thereon. The latter member, at its side adjacent the pulley 80, has a cylindrical flange 90 projecting therefrom, the inner periphery of which is spaced from the threaded portion 86 of the boss 85. This inner peripheral surface of the flange 90 provides a bearing seat for a second cone pulley member 95 which is formed with a cylindrical flange 96 having an outer diameter substantially equal to the inner peripheral diameter of the flange 90. The pulley member 95 has a central aperture 97 which is of such diameter that the pulley does not engage the threads 86 on the boss 85.

In its outer surface, the flange 96 is provided with a circumferentially extending groove 100 into which machine screws 101 threaded through the flange 90 project. These screws retain the flange 96 within the inner periphery of the flange 90 but permit relative rotation of the two flanges. Thus, the flange 90 and the cylindrical member 87 may be rotated relative to the pulley 95. In order so to secure the pulley 95 and the cylindrical member 87 that they may rotate together, a pin 105 is provided which normally projects through an opening 109 in the flange 90, through the groove 100, and into one of a plurality of openings 112 provided in the base wall defining the groove 100. Normally, the pin is retained in its operative position by means of a leaf spring 106 secured by screws 107 to the outer surface of the cylindrical member 87, which has an opening 108 substantially greater than the diameter of the pin 105. Beneath this plate, the pin 105 is provided with a radial projection 110 which normally lies in a recess 111 formed in the outer surface of the flange 90 at one side of the opening 109.

As best shown by Fig. 6, when it is desired to disengage the pin 105 from engagement with an opening 112 in the groove 100, it is drawn radially outwardly until the surface of the projection 110 nearest the inner end of the pin is slightly outwardly of the outer cylindrical surface of the member 87. Then the pin is turned from its position of coincidence with respect to the recess 111 and released. Owing to the fact that the projection 110 does not now coincide with the recess 111, it is retained in its latter position by reason of the abutment of the projection 110 with the outer cylindrical surface of the member 87 adjacent the recess. During the movement of the pin 105 outwardly, the end of the plate 106 engaging the pin 105 is sprung outwardly, and because of this fact, when the pin 105 is again so turned that the projection 110 coincides with the recess 111, the plate 106 serves automatically to return the pin to its operative position in which the inner end thereof is projected into one of the openings 112. In order to prevent relative rotation of the pulleys 80 and 95, the cylindrical boss 85 of the pulley 80 is provided with a keyway 120 (Fig. 5) extending throughout its length, which cooperates with a key 121 rigidly secured to the pulley 95.

If it is desired to adjust the pulley 95 relative to the pulley 80, the pin 105 is moved from its position in which it engages an opening 112 in the groove 100 and thereafter the cylindrical member 87 is rotated relative to the cylindrical boss 85 on the pulley 80. This results in a movement of the member 87 longitudinally of the boss 85 by reason of the threaded engagement between these members. Simultaneously, the pulley 95 is moved relative to the pulley 80 by reason of the engagement of the screws 101 on the member 87 with the groove 100 in the pulley 95. When the pulley 95 has been moved relative to the pulley 80 the distance desired, the pin 105 is so moved that the projection 110 again coincides with the recess 111 and the plate 106 automatically returns the pin to its operative position in which the inner end of the pin engages an opening 112, thereby locking the pulley 95 and the cylindrical member for simultaneous rotary movement. It is also apparent that the pulleys 80 and 95 and the cylindrical member 87 are free to slide longitudinally on the sleeve 76 by reason of the fact that the cylindrical boss 85 which supports the pulley 95 and cylindrical member 87 is splined to the sleeve 76 as indicated at 82.

The sleeve 76, at its end opposite the friction clutch member 75, is provided with a friction clutch member 125, which is rigidly secured to the end of the sleeve by screws 126. The clutch member 125 engages a second clutch member 130, which is splined to the shaft 59 by means of a key 131 slidable in a keyway 132 in the shaft. A second knurled cylindrical member 133 is mounted on sleeves 134 and 135 rotatable on the end of the shaft adjacent the friction clutch member 130. This member, adjacent the latter clutch member, is provided with a cylindrical flange 136 which retains a ball bearing 137 disposed between the end of the cylindrical member and the clutch member. The end of the cylindrical member remote with respect to the clutch member 130 is threaded as indicated at 140 and projects through a threaded opening 141 formed intermediate the ends of an arm 142 which is similar to the arm 63. This arm, at its lower end, is provided with an opening 143, which receives the sleeve 65 on the shaft 50. The arm is retained adjacent the bearing 41 by reason of the set screw 145 projecting through the arm and abutting the sleeve 65. Normally the cylindrical member 133 is prevented from turning relative to the arm 142 by means of a screw 147 threaded through the arm and engaging the member. When it is desired to adjust the position of the clutch members 125 and 130 and 70 and 75, the screw 147 is loosened and the member 133 rotated with respect to the shaft 59. Because of the fact that the arms 142 and 63 are rigidly retained in fixed spaced relation by the set screws 145 and 68 respectively, engaging the sleeves 65 and 68 on the shaft 50, rotation of the cylindrical member 133 results in a movement of the clutch member 130 against the clutch member 125 and consequent movement of the clutch member 75 against the clutch member 70 or else a lessening of the engagement of such clutch members, depending upon the direction in which the member 133 is turned.

The sleeve 65 between the arms 63 and 142 supports a third arm 150 which is retained on the sleeve by means of set screws 151 and 152 threaded through the arm and engaging the sleeve. As best shown by Fig. 2, the outer end of this arm is bifurcated, thereby providing spaced arms 155 and 156. As best shown by Fig. 1, each arm is provided at its outer end with an elongate slot 157.

A shaft 159 rotatably supporting a roller 158, has its ends disposed in the slots 157. An eye bolt 160, adjustably secured to each end of the shaft 159 in turn is secured to one end of a spring 161, the other end of which is secured to an apertured plate 162. Below the shaft 159, a second shaft 170 supporting a roller 171, has its ends journaled in openings 172 and 173 in the arms 155 and 156, respectively, such shaft also projecting through the plates 162. Thus, the shaft 159 of the roller 158 is resiliently retained in the lower ends of the slots 157. However, it is apparent that by removing the plates from engagement with the ends of the shaft 170, the shaft 159 and roller 158 may be removed from the slots 157.

The upper ends of the arms 63 and 142 terminate in apertured bosses 160' and 161', respectively, which loosely receive a shaft 162'. Between the arms 63 and 142, the shaft 162' is provided with a sleeve 163 rigidly secured thereto by screws 164. The sleeve is connected to the boss 160' by a helical spring 166 having one end secured to the sleeve by a screw 167 and its other end secured to the boss 160' by a screw 168. Likewise, the boss 161' is connected to the sleeve by means of a helical spring 169 having its ends secured to the sleeve and boss respectively, by screws 175 and 176.

The ends of the shaft 162' beyond the bosses 160' and 161' are rigidly secured to the upper ends of a pair of links 180 and 181, respectively. In turn, the other ends of the links 180 and 181 are pivotally connected to the ends of other links 182 and 183 by means of pivot bolts 185 and 186. The ends of the links 182 and 183 remote from the pivot bolts 185 and 186 are rigidly secured to other pivot bolts 190 and 191 respectively. The latter are journaled in bearing brackets 192 and 193, respectively, which are bolted, as indicated at 194, to the front faces of the frame members 10 and 11. The axis of the pivot bolts 190 and 191 coincides with the axis of the shaft 162 when the latter is in its operative position and hence, the links 180 and 182 as well as the links 181 and 183 may be simultaneously moved about the common axis. The ends of the links 182 and 183 secured to the pivot bolts 190 and 191, also are provided with lugs 200 and 201 which have arcuate portions 202 and 203 respectively, projecting past the ends of the links 180 and 181 secured to the shaft 162. These lugs normally are so positioned that they prevent movement of the arms 63 and 142 about the shaft 50 by reason of the fact that the lugs are positioned in the line of movement of the shaft 162 about the shaft.

In operation, the pulleys 80 and 95 are adjusted in order to accommodate the size of conduit 15 being manufactured and the friction clutch members 125 and 130, and 70 and 75 are suitably adjusted in order to insure rotation of the pulleys by the shaft 50 through the gears 55 and 58. The links 180—182 and 181—183 then are simultaneously moved about the axis of the pivot bolts 190 and 191 and the shaft 162, in a clockwise direction, until the links are in the position indicated at 225 in Fig. 1. In this position, the links are disposed substantially in alignment with a plane coinciding with the axis of the pivot bolts 190 and 191, the shaft 162 and the shaft 50, thereby permitting movement of the arms 63 and 142 in a counter-clockwise direction about the latter shaft. It is apparent that the lugs 202 and 203 being moved with the links 182 and 183, are so positioned after the links are moved to their position indicated at 225 in Fig. 1, that movement of the ends of the links 180 and 181 secured to the shaft 162 about the shaft 50 is permitted. Thereafter, the arms 63 and 142 are moved in a counter-clockwise direction about the shaft 50 until they assume the position indicated at 230 in Fig. 1. During this movement of the arms 63 and 142, the links 180 and 182 are moved in opposite directions about the axis of the pivot bolt 185 and finally assume aligned positions in which they project in opposite directions from the pivot bolt. Likewise, the links 180 and 183 are moved until they assume similar aligned positions. It is apparent that during this movement of the links, the links 180 and 181 are turned clockwise, which results in tightening of the springs 166 and 169. Hence the movement of the arms 63 and 142 to their inoperative positions is buffeted.

When the arms 63 and 142 are so positioned, the conduit 15 is threaded through the stripping machine and the strips of lead 21 and 22 are trained about the rollers 26 and 36 respectively and between the cutting rollers 27—28 and 37—38. The roller 158 now is removed from the slots 157 in the arms 155 and 156 and the conduit is trained between the pulleys 80 and 95 and over the roller 171. Then the roller 158 is returned to its operative position in the slots 157, and by reason of the fact that the shaft 159 supporting the roller 158 is resiliently retained in the lower ends of the slots, the conduit 15 is firmly but resiliently retained in engagement with the pulleys 80 and 95. The roller 171 serves as additional support for the conduit as it is directed away from the machine. The links 182 and 183 then are moved in clockwise directions about the pivot bolts 190 and 191 respectively, until they assume the positions indicated at 225 in Fig. 1. During this movement of the links 182 and 183, the links 180 and 181 assume a position coinciding with the links 182 and 183. Also, during this movement of the links, the springs 166 and 169 assist the return of the arms 63 and 142 to their operative positions owing to the fact that the springs are being freed from a tensioned state. Thereafter, the links are moved bodily in a counter-clockwise direction until they assume the position shown in full lines in Fig. 1. As the links now are positioned, the lugs 202 and 203 positively prevent counter-clockwise movement of the arms 63 and 142 about the shaft 50.

The pulleys 80 and 95 are driven at a slightly greater peripheral rate of speed than the linear speed of the conduit 15, from which it follows that the pulleys constantly exert a pull on the conduit 15. By reason of the frictional engagement between the pulleys 80 and 95 and the conduit 15, the latter is prevented from being drawn along with either of the lead strips 21 and 22. The rollers 158 and 171, between which the conduit is trained, serve to accentuate the engagement of the conduit with the pulleys because they retain the conduit in engagement with a considerable circumferential length thereof.

From this description, it is apparent that a mechanism has been provided which constantly exerts a pull on a conduit from which a lead covering is being removed by a stripping machine adapted for that purpose. Thus, the conduit is prevented from being drawn along with the strips of lead covering removed therefrom thereby obviating occurrences in which a considerable portion of the conduit would be injured by reason of its being drawn along with the strips of lead covering. It is apparent that the mechanism may be swung from its operative to its inoperative position easily and when once in its operative position, it is retained therein against accidental displacement. Moreover, since the springs 166 and 169 connect the arms 63 and 142 respectively with the shaft 162, it is apparent that they serve as buffers for preventing the arms from gravitating to their inoperative positions at a high rate of speed. Also, the springs, because they are wound during the descent of the arms 63 and 142, serve as counterbalances which facilitate movement of the arms to their operative positions.

Although I have illustrated only the preferred form of the invention and have described that form in detail, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. In a machine for stripping a covering from a conduit, means for splitting the covering, means for pulling the split covering divergently from the course of the conduit and rotary means for constantly exerting a pull on the conduit as the covering is stripped therefrom, said rotary means being driven at a greater peripheral speed than the linear speed at which the covering is stripped from the conduit.

2. In a machine for stripping a covering from a conduit, means for splitting the covering, means for pulling the split covering divergently from the course of the conduit, a grooved roller for constantly exerting a pull on the conduit as the covering is stripped therefrom, said roller being driven at a greater peripheral speed than the speed at which the covering is stripped from the conduit, and a friction clutch device.

3. The combination with a machine for stripping a covering from a conduit, of a framework pivoted to the frame of the machine, and rotary means mounted in the framework for exerting a constant pull on the conduit as the covering is stripped therefrom.

4. The combination with a machine for stripping a covering from a conduit, of a framework pivoted to the frame of the machine, and rotary means mounted in the framework for exerting a constant pull on the conduit as the covering is stripped therefrom, said means being driven at a greater peripheral speed than the linear speed at which the covering is stripped from the conduit.

5. The combination with a machine for stripping a covering from a conduit, of a framework pivoted to the frame of the machine, and rotary means mounted in the framework for exerting a constant pull on the conduit as the covering is stripped therefrom, said framework at its end opposite the pivot being connected to the frame of the machine by a linkage device.

6. The combination with a machine for stripping a covering from a conduit, of a framework pivoted to the frame of the machine, and rotary means mounted in the framework for exerting a constant pull on the conduit as the covering is stripped therefrom, and a pair of links pivotally connected at adjacent ends, having their remote ends pivotally connected to the framework and frame of the machine respectively.

7. The combination with a machine for stripping a covering from a conduit, of a framework pivoted to the frame of the machine, rotary means mounted in the framework for exerting a constant pull on the conduit as the covering is stripped therefrom, and a pair of links pivotally connected at adjacent ends, having their remote ends pivotally connected to the framework and frame of the machine respectively, said links being disposed in substantially coinciding positions when the framework is in its operative position, and means normally for retaining them in such position.

8. The combination with a machine for stripping a covering from a conduit, of a framework pivoted to the frame of the machine, rotary means mounted in the framework for exerting a constant pull on the conduit as the covering is stripped therefrom, and a pair of links pivotally connected at adjacent ends, having their remote ends pivotally connected to the framework and frame of the machine respectively, said links being disposed in substantially coinciding positions when the framework is in its operative position, and means on one of the links normally for retaining them in such position.

9. The combination with a machine for stripping a covering from a conduit, of a roller mechanism for exerting a constant pull on the conduit as the covering is stripped therefrom, said mechanism comprising a driven shaft, a pair of cone pulleys on said shaft, said pulleys having their conical surfaces adjacent, and friction clutch means operatively connecting the pulleys to the shaft.

10. The combination with a machine for stripping a covering from a conduit, of a roller mechanism for exerting a constant pull on the conduit as the covering is stripped therefrom, said mechanism comprising a driven shaft, a sleeve rotatably mounted on the shaft, conduit engaging means splined to the sleeve, and friction clutch devices operatively connecting the sleeve to the shaft.

11. The combination with a machine for stripping a covering from a conduit, of a roller mechanism for exerting a constant pull on the conduit as the covering is stripped therefrom, said mechanism comprising a driven shaft, a pair of cone pulleys on said shaft, said pulleys having their conical surfaces adjacent, friction clutch means operatively connecting the pulleys to the shaft, and means for adjusting the pulleys relative to each other.

12. The combination with a machine for stripping a covering from a conduit, of a driven shaft, a sleeve rotatable on the shaft, a pair of cone pulleys splined to the sleeve, means for adjusting the pulleys relative to each other, and friction clutch devices operatively connecting the sleeve to the shaft.

13. The combination with a machine for stripping a covering from a conduit, of a framework pivoted to the frame of the machine, a driven pulley mechanism for exerting a constant pull on the conduit, and means for positively retaining the conduit in engagement with the pulley mechanism.

14. The combination with a machine for stripping a covering from a conduit, of a driven shaft, a pair of cone pulleys for exerting a constant pull on the conduit, said pulleys being driven by the shaft, the conical faces of the pulleys being disposed adjacent, and a roller yieldably retaining the conduit between the pulleys.

In witness whereof, I have hereunto signed my name at Akron, in the county of Summit and State of Ohio, U. S. A., this 17th day of July, 1929.

EDWARD C. KASTNER.